(12) United States Patent
Palmer

(10) Patent No.: US 7,978,195 B2
(45) Date of Patent: *Jul. 12, 2011

(54) METHOD FOR SUPERIMPOSING STATISTICAL INFORMATION ON TABULAR DATA

(75) Inventor: James R. Palmer, Austin, TX (US)

(73) Assignee: HyPerformix, Inc., Austin, TX (US)

( * ) Notice: Subject to any disclaimer, the term of this patent is extended or adjusted under 35 U.S.C. 154(b) by 969 days.

This patent is subject to a terminal disclaimer.

(21) Appl. No.: 11/824,756

(22) Filed: Jul. 2, 2007

(65) Prior Publication Data

US 2009/0009517 A1 Jan. 8, 2009

(51) Int. Cl.
*G06T 11/40* (2006.01)

(52) U.S. Cl. ...................................... 345/440

(58) Field of Classification Search .................. 345/440
See application file for complete search history.

(56) References Cited

U.S. PATENT DOCUMENTS

| | | | |
|---|---|---|---|
| 6,189,064 B1 * | 2/2001 | MacInnis et al. | 710/244 |
| 6,256,649 B1 * | 7/2001 | Mackinlay et al. | 715/212 |
| 6,571,251 B1 * | 5/2003 | Koski et al. | 1/1 |
| 6,745,390 B1 | 6/2004 | Reynolds et al. | |
| 6,812,926 B1 | 11/2004 | Rugge | |
| 7,256,784 B2 * | 8/2007 | Palmer | 345/440 |
| 2001/0029506 A1 * | 10/2001 | Lee et al. | 707/102 |
| 2002/0078131 A1 | 6/2002 | Dowd et al. | |
| 2003/0030637 A1 * | 2/2003 | Grinstein et al. | 345/420 |
| 2004/0160341 A1 | 8/2004 | Feyereisen et al. | |
| 2004/0212618 A1 * | 10/2004 | Palmer | 345/440 |

* cited by examiner

*Primary Examiner* — Javid A Amini

(74) *Attorney, Agent, or Firm* — Schultz & Associates, P.C.

(57) ABSTRACT

A method is disclosed for displaying a plurality of statistical data usually presented in a histogram, such as sample counts and percentages of a collection of categorized samples, in a compact single table. The method comprises presenting grouped statistical data that exists within a collection of "buckets" and presenting the sample count for the collected data as an integer in a corresponding cell in the table. Additionally, as disclosed by the present invention, the percentage value of the samples located in each bucket data cell is represented in the data cell as a superimposed gray-scale representation. Presenting the percentages in gray-scale provides overall clarity to the table, assists in ensuring that data can be quickly and easily interpreted and not be subject to misinterpretation, and further allows for the compact display of such information in a single table and subsequent manipulation by automated analysis tools.

6 Claims, 6 Drawing Sheets

METHOD FOR SUPERIMPOSING STATISTICAL INFORMATION ON TABULAR DATA

CROSS-REFERENCE TO RELATED APPLICATIONS

This application claims priority to U.S. patent application Ser. No. 10/832,204 filed Apr. 26, 2004, which claims benefit to U.S. Provisional Application No. 60/465,045 filed Apr. 24, 2003.

FIELD OF THE INVENTION

The present invention disclosed herein relates to the displaying of any statistical data and particularly to a method for superimposing a graph onto tabular data that is normally displayed utilizing a bar chart. Even more particularly, the invention relates to statistical data containing sample counts and percentages, wherein such data is displayed within a single table.

BACKGROUND OF THE INVENTION

Statistics have been used for centuries to quantify data. Today specific statistical measures and characteristics of database and schema objects and other forms of data presentation, such as the data distribution and storage characteristics of tables, columns, indexes, and partitions, are valuable to users and analysts and can be presented in a plurality of forms. One such example is as a histogram. In viewing information and characterizing a set of samples, a histogram can provide a more complete picture of the distribution of the data than statistical measures such as the mean and standard deviation, etc. This is done by partitioning the data into a collection of buckets and reporting the number or percentage of samples that fall into each bucket. This report can take on various forms. Commonly used forms include tables, line, bar, and pie charts.

The histogram has become a popular tool used in graphing data from databases and other data sources. The histogram is used to summarize discrete or continuous data that are measured on an interval scale. In a line or bar chart presentation of a histogram, an independent variable (usually a bucket or range of data) is plotted along the horizontal axis of the histogram, and the dependent variable (usually a percentage) is plotted along the vertical axis of the histogram. The independent variable is capable of attaining only a finite number of discrete values (for example, five) rather than a continuous range of values. However, the dependent variable can span a continuous range.

Histograms are also often used to illustrate the major features of the distribution of data in a convenient form. A histogram divides up the range of possible values in a data set into classes, groups, or buckets. In a bar chart histogram, for each class, group, or bucket a rectangle is constructed with a base lengths being equal and the height proportional to the number of observations falling into that class, group, or bucket.

Generally, a bar chart histogram will have bars of equal width, although this is not the case when class, group, or bucket intervals vary in size. The intervals do not have to be equal. For example, one bucket could be 0-5 while a second bucket is 6-15. Histograms can have an appearance similar to a vertical or horizontal bar graph. When the variables are continuous (i.e., a variable which can assume an infinite number of real values . . . e.g., an individual can walk 2.456721 . . . miles) there no gaps are present between the bars. However, when the variables are discrete (i.e., a numeric value that takes only a finite number of real values . . . e.g., X can equal only 1, 3, 5, and 1,000) gaps should be left between the bars. In general, FIG. 5 provides a good example of a histogram.

To analysts, the strength of a histogram is that it provides an easy-to-read picture of the location and variation within a data set. There are, however, various weaknesses in histograms. The first is that histograms can be manipulated to show different pictures. In such manipulations if too few or too many bars are used, the histogram can be very misleading. This is an area which requires some judgment, and perhaps various levels of experimentation, all based on the analyst's experience.

Another weakness is that histograms can also obscure differences among data sets. For example, if you looked at data for the number of births per day in the United States in 2003, you would miss any certain variations (e.g. births to single parents, born as twins, mortality information etc.). Likewise, in industry applications, a histogram of a particular process run can usually tell only one part of a long story. There then evolves a need to keep reviewing the histograms and control charts for consecutive similar process runs over an extended time to gain useful knowledge about the specific process.

The analysis of the shape or the clustering of statistical data within histograms also lends useful information to analysts. Clustering, in one definition, deals with finding a structure in a collection of unlabeled data. Clustering could also be further defined as the process of organizing objects into groups whose members are similar in some way. A cluster is, therefore, a collection of objects which are "similar" between them and are "dissimilar" to the objects belonging to other clusters. So, the goal of clustering is to determine the intrinsic grouping in a set of unlabeled data.

Cluster analysis is data analysis with an objective of sorting categories or cases (people, things, events, etc) into groups, or clusters, so that the degree of association is strong between members of the same cluster and weak between members of different clusters. Each cluster thus describes, in terms of the data collected, the class to which its members belong; and this description may be abstracted through use from the particular to the general class or type.

Frequency information, as it relates to statistical data, is also an important analysis tool. The frequency of a particular observation is defined as the number of times the observation occurs in the data. The distribution of a variable is the pattern of frequencies of the observation. Frequency distributions can be portrayed as frequency tables, histograms, or polygons. Frequency distributions can show either the actual number of observations falling in each range or the percentage of observations. In the latter instance, the distribution is called a relative frequency distribution.

Frequency distribution tables can be used for both categorical and numeric variables. Numeric variables may be either continuous or discrete.

A continuous variable is said to be continuous if it can assume an infinite number of real values. Examples of a continuous variable are distance, age and temperature. Continuous variables should only be used with class intervals, which will be explained below. The measurement of a continuous variable is restricted by the methods used, or by the accuracy of the measuring instruments. For example, the height of a student is a continuous variable because a student may be 5.5321748755 . . . feet tall. However, when the height of a person is measured, it is usually measured to the nearest half inch. Thus, this student's height would be recorded as 5½ feet.

Discrete variables can only take a finite number of real values. An example of a discrete variable would be the score given by a judge to a gymnast in competition: the range is 0 to 10 and the score is always given to one decimal (e.g., a score of 8.5). Discrete variables may also be grouped. Again, grouping variables makes them easier to handle.

What follows below is an explanation of constructing a series of different types of frequency distribution tables. Each example is shown to depict the various, but unlimited, types of data that is compiled for use in histograms.

EXAMPLE 1

Constructing a Frequency Distribution Table

A survey was taken on Bridle Path Street and in each of the 20 homes, families were asked how many children live in their household. The results of the survey were recorded as follows:
1, 2, 1, 0, 3, 4, 0, 1, 1, 1, 2, 2, 3, 2, 3, 2, 1, 4, 0, 0.

The following steps can be used to present this data in a frequency distribution table.
1. Divide the results (x) into intervals, and then count the number of results in each interval. In this case, the intervals would be the number of households with no children (0), one child (1), two children (2) and so forth.
2. Make a table with separate columns for the interval numbers (the number of children per household), the tallied results, and the frequency of results in each interval. Label these columns Number of children, Tally and Frequency.
3. Read the list of data from left to right and place a tally mark in the appropriate row. For example, the first result is a 1, so place a tally mark in the row beside where 1 appears in the interval column (Number of children). The next result is a 2, so place a tally mark in the row beside the 2, and so on.
4. Add up the number of tally marks in each row and record them in the final column entitled Frequency.

An example of a frequency distribution table for the example above would be similar to the Table 1 below. By looking at this frequency distribution in Table 1 we can see that out of 20 households surveyed, 4 households had no children, 6 households had 1 child, etc.

TABLE 1

Frequency table for the number of children in each household

| Number of children (x) | Tally | Frequency (f) |
|---|---|---|
| 0 | 1111 | 4 |
| 1 | 111111 | 6 |
| 2 | 11111 | 5 |
| 3 | 111 | 3 |
| 4 | 11 | 2 |

If a variable takes a large number of values, then it is easier to present and handle the data by grouping the values into what is known as class intervals. As mentioned above, continuous variables are more likely to be presented in class intervals, while discrete variables can be grouped into class intervals or not. To illustrate, suppose one sets out age ranges for a study of young people, while allowing for the possibility that some older people may also fall into the scope of our study.

The frequency of a class interval is the number of observations that occur in a particular predefined interval. So, for example, if 20 people aged 5 to 9 appear in our study's data, the frequency for the 5-9 interval is 20.

The endpoints of a class interval are the lowest and highest values that a variable can take. So, the intervals in our study are 0 to 4 years, 5 to 9 years, 10 to 14 years, 15 to 19 years, 20 to 24 years, and 25 years and over. The endpoints of the first interval are 0 and 4 if the variable is discrete, and 0 and 4.999 if the variable is continuous. The endpoints of the other class intervals would be determined in the same way.

EXAMPLE 2

Constructing Frequency Distribution Tables for Large Numbers of Observations

In this example thirty AA batteries were tested to determine how long they would last. The results, to the nearest minute of duration, were recorded as follows: 423, 369, 387, 411, 393, 394, 371, 377, 389, 409, 392, 408, 431, 401, 363, 391, 405, 382, 400, 381, 399, 415, 428, 422, 396, 372, 410, 419, 386, and 390.

Using the steps in Example 1, the given data, and a class interval of 10, a frequency distribution table can be constructed wherein the interval for the first class is 360 to 369 and includes 363 (the lowest value). The completed frequency distribution table would look similar to Table 2 below.

TABLE 2

Life of AA batteries, in minutes

| Battery life, minutes (x) | Tally | Frequency (f) |
|---|---|---|
| 360-369 | 11 | 2 |
| 370-379 | 111 | 3 |
| 380-389 | 11111 | 5 |
| 390-399 | 1111111 | 7 |
| 400-409 | 11111 | 5 |
| 410-419 | 1111 | 4 |
| 420-429 | 111 | 3 |
| 430-439 | 1 | 1 |
| Total | | 30 |

Today, problems exist when using histograms containing the types of information compiled and using data as in the previous examples. These problems specifically relate on how to display any tabular data contained therein into a compact, discernable, and easily interpreted form that is suitable for additional automated analysis. This problem is exacerbated in the case where the samples are categorized. In such cases, it is often desirable to display a histogram for each category and one for the composite. Therefore, what is now needed is a method for organizing and compactly presenting a collection of categorized samples while ensuring that the tabular data contained therein is easily read and interpreted by both the user/analyst and the various analysis tools, such as spreadsheets.

SUMMARY OF THE INVENTION

It is therefore the primary object of the present invention to provide a method for organizing and compactly displaying a collection of categorized data samples that simultaneously allows for ease of interpretation by the user or analyst and further automated analysis of the tabular data contained therein.

In this invention, data is organized within a single table because it offers both a compact representation of the data and can be easily interpreted by automated analysis tools such as spreadsheets. For example, to aid the user/analyst in interpreting percentage data within certain data cells, all cells containing percentage data are graphically superimposed with various shades of gray to indicate the relative percentage of samples contained in the data cell within each bucket. This provides the reader with a graphical presentation of the data distribution without requiring additional tabular space.

The present invention provides columns which identify the category, count, and buckets for the data contained. There is one row for each category and one row for the composite. The composite row can be either the first or last row. The sample count for each bucket is presented as an integer in the corresponding cell. The percentage of samples in each bucket is represented as a level of gray. While it is possible to present both the sample count and percentage as numeric values in a single cell, e.g., "312 (28%)" such an approach makes it more difficult for the reader to quickly interpret the data and greatly complicates further automated analysis. Presenting the percentages in gray scale provides a picture of the data that can be quickly interpreted. Using gray scale depiction for percentage information allows the data to be interpreted without requiring a key. Furthermore, it is not subject to misinterpretation due to a user's physical limitations (e.g., color blindness). However, by superimposing gray scale of the cell data is not meant to provide an analyst with exact percentage information but rather a generalized quick reference. Combining the histogram data with the standard statistic measures provides a complete compact view of the data, which is easy to generate and can be viewed by HTML browsers, and also viewed and manipulated in spreadsheets.

Other methods, systems, features, and advantages of the present invention will be or become apparent to one with skill in the art upon examination of the drawings and detailed description. It is intended that all such additional methods, systems, features, and advantages be included within this description, be within the scope of the present invention, and be protected by the accompanying claims.

BRIEF DESCRIPTION OF THE DRAWINGS

Many of the aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
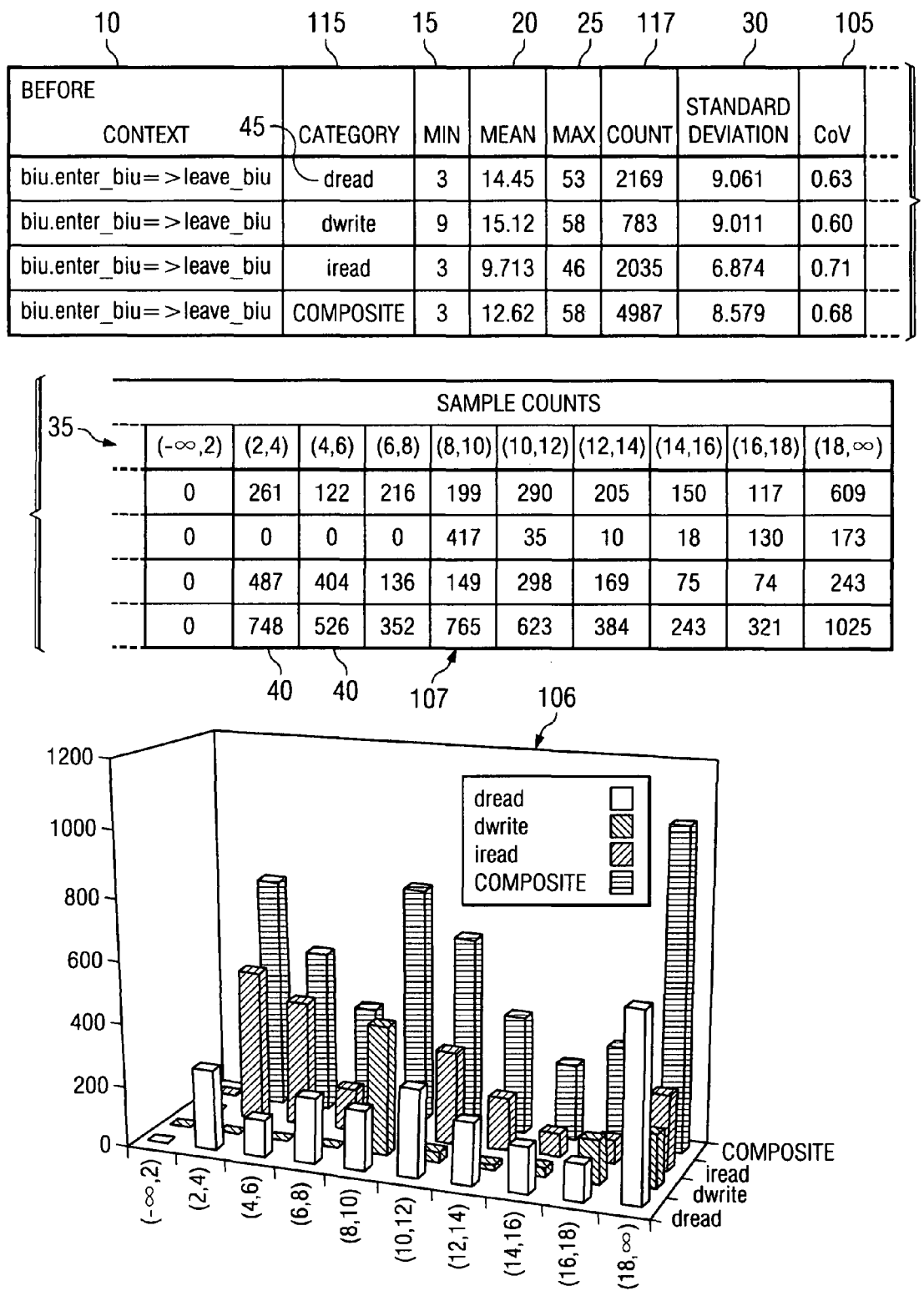
FIG. 1 is a table depicting a "before" example of a non-compact statistical table having a plurality of statistical data represented with an associated bar graph depiction.

In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The invention is described with reference to specific embodiments. It will, however, be evident that various modifications and changes may be made thereto without departing from the broader spirit and scope of the invention.

The reader is to understand that the specific ordering and combination of method actions shown in the method flow diagrams described herein are merely illustrative, and the invention can be performed using different, additional, or different combinations/ordering of method actions and components. For example, the invention is particularly illustrated herein with reference to specific database objects such as tables, columns, and rows, but it is noted that the inventive principles are equally applicable to other types and forms of data presentation as well. The specification and drawings are, accordingly, to be regarded in an illustrative rather than restrictive sense.

The present invention disclosed herein is found within a software program that enables a user or analyst to construct a compact single table for quickly identifying and interpreting various statistical data and information presented therein. Such data includes, but is not limited to, sample counts, gray-scale depiction of percentage information, categories, bucket ranges, and other standard statistical measures.

The present invention makes it easier to identify the shape or clustering of the various statistical data collected and presented by looking at a gray scale depiction for frequency or percentage information. The general shape or clustering of data can be determined by referring to the single table disclosed herein and by specifically viewing a gray scale depiction of the percentages or distribution. The effectiveness of the present invention is realized by the application of the method disclosed herein to examples 1 and 2 above and, below, in Example 3 as relating to the construction of relative frequency and percentage frequency tables.

For example, an analyst studying relative frequency and percentage frequency data might want to know not only how long batteries last as depicted in Table 2 of Example 2, but also might want to know what proportion of the batteries falls into each class interval of battery life. The relative frequency of a particular observation or class interval is found by dividing the frequency (f) by the number of observations (n): that is, (f÷n). Thus relative frequency=frequency÷number of observations. The percentage frequency is then found by multiplying each relative frequency value by 100. Thus Percentage frequency=relative frequency×100=f÷n×100.

Although the intent of the present invention is not to facilitate the extraction of exact frequency data nor is it practical for a user/analyst to attempt to glean the exact percentages, it is intended to provide a quick-look general indication of frequency distributions which are encoded by the present invention in gray-scale. This becomes specifically advantageous where the data is clustered. In example 2, Table 2, the gray-scale method of the present invention would depict the percentage of batteries falling into each specific class interval of battery life. If desired, frequency data can also be included as additional columns in the table. However, such columns should not be interspersed with the sample count columns, since that would complicate subsequent automated analysis.

EXAMPLE 3

Constructing Relative Frequency and Percentage Frequency Tables

Using the data from Example 2 above, a frequency table can be constructed giving the relative frequency and percentage frequency of each interval of battery life the table would appear similar as that in Table 3.

TABLE 3

Life of AA batteries, in minutes

| Battery life, minutes (x) | Frequency (f) | Relative frequency | Percent frequency |
|---|---|---|---|
| 360-369 | 2 | 0.07 | 7 |
| 370-379 | 3 | 0.10 | 10 |
| 380-389 | 5 | 0.17 | 17 |
| 390-399 | 7 | 0.23 | 23 |
| 400-409 | 5 | 0.17 | 17 |
| 410-419 | 4 | 0.13 | 13 |
| 420-429 | 3 | 0.10 | 10 |
| 430-439 | 1 | 0.03 | 3 |
| Total | 30 | 1.00 | 100 |

An user/analyst reviewing and utilizing these data could now say that:

7% of AA batteries have a life of from 360 minutes up to but less than 370 minutes, and that the probability of any randomly selected AA battery having a life in this range is approximately 0.07.

After data has been collected, the data as presented in Table 3 above can be used by the method of the present invention to compactly and simultaneously display all information using only one table comprising a column header and a single data row. For example, the first column in Table 3 above "Battery life, minutes (x)" would be converted to column headers. The second column of Table 3 "Frequency (f)" would be presented as numeric values in the data row. The third and fourth columns of Table 3, "Relative frequency" and "Percent frequency" (which are identical except for scale), would be presented as gray-scale background in the data cell for the data row.

Now referring to FIG. 1, the data shown within the table in FIG. 1 contains various types of statistical data, most of which include frequency distribution data. The data shown specifically relates to response statistics between two nodes (e.g., biu.enter_biu=>leave_biu) and represents the time it takes for specific data to travel between the nodes indicated. The data within FIG. 1 is shown as an example of types of data and is not intended to limit the scope of types of statistical data that can be used by the present invention to display as disclosed herein. Additionally, the method of the present invention is not intended to be limited to the display of histogram data, but is also applicable to any tabular data that would normally be displayed using a bar chart.

In FIG. 1 the data presented therein specifically relates to the data's context 10, category 115, minimum 15, maximum 25 and mean 20 response times, standard deviation 30, coefficient of variation 105, and samples of data 40 under each column 35. The columns 35 displayed to the right of the coefficient of variation ("CoV") column 105 (i.e., (-∞, 2], (2, 4], (4, 6], (6, 8], (8, 10], (10, 12], (12, 14], (14, 16], (16, 18], (18, ∞] contain the various distribution data within the stated bucket's interval range. Specifically, FIG. 1 shows a "before" table with a plurality of data being displayed in a non-compact form and an associated bar graph of the data before the method of the present invention was applied to alter its display characteristics.

In FIG. 1 under the sample counts dread category 45, it is shown therein that 261 response time values were between (2,4], 122 were between (4,6], 216 were between (6,8], 199 were between (8,10] . . . etc. Another way of representing frequency distribution is with percentages. For example, in FIG. 1, 5 percent of the response times were between 2 and 4 seconds, 2 percent were between 4 and 6 seconds, 4 percent were between 6 and 8 seconds and 4 percent were between 8 and 10 seconds . . . etc. It is often important and valuable to know both the absolute counts as well as the percentages, but displaying both forms of data information within one table, as shown here in FIG. 1, or two tables can be awkward, difficult to follow, and harder to read than other more compact and simpler tables.

In FIG. 1, a user/analyst is forced to inconveniently refer between the sample count portion 107 and the accompanying bar graph 106 to ascertain detailed information such as a category's 115 sample count, percentage information, and other useful data.

Figure 2:
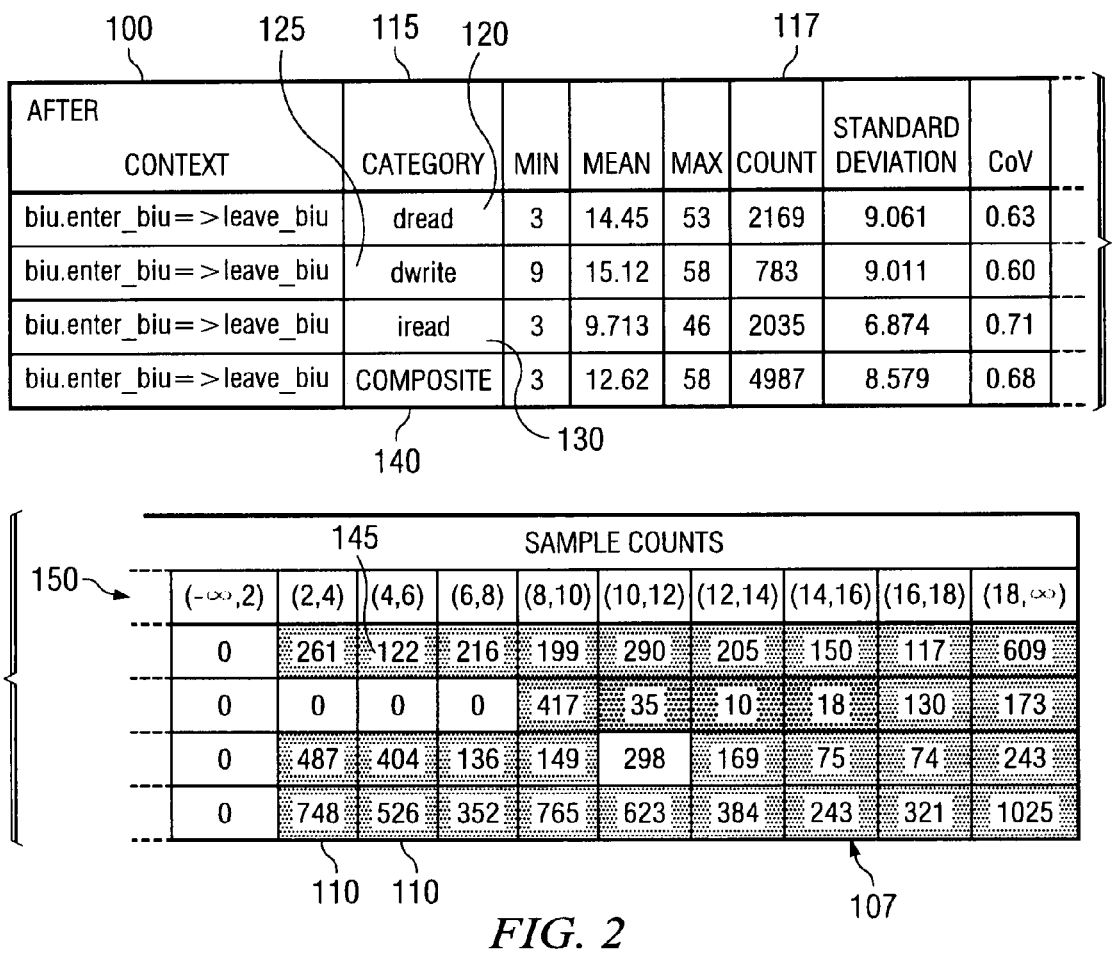
FIG. 2 is a table depicting an "after" example of a compact table display of the statistical information shown in FIG. 1 using the method of the present invention.

However, with software programmed with the method of the present invention the percentage information can be easily calculated and superimposed, as shown in FIG. 2, over the absolute values in relative data cells using gray-scale 110 determined, assigned, and displayed by the method presented herein. More specifically, cell data ranges having higher/larger percentage values are displayed by the present invention in darker shades of gray. The shade of gray gets incrementally darker as the percentage value increases. In contrast, cell data ranges having lower/smaller percentage values are displayed by the present invention in lighter shades of gray. The shades of gray incrementally get lighter as the relative percentage value decreases. The effect of using percentage value gray shading quickly draws the reader's attention to the ranges with the highest/largest percentages and gives an overall "quick-look picture" of the frequency distribution, thereby eliminating the inconveniences noted above when viewing large tables or two tables at a time.

As graphically displayed in FIG. 2, the method of the present invention is realized by providing a novel technique that enables the user/analyst to display both sample counts and percentages of a collection of categorized samples within a single compact single table. It should be understood that the applicability of the method disclosed herein is universal anytime statistical data is desired to be presented in a single compact tabular form. The following are examples of various types of information wherein samples can be taken and used with the present invention: the arrival of work at a particular node such as a server or an electronic gate (i.e., a request for service of any general sense), and arrival rates of "work" at a server (i.e., the number of transactions waiting within a queue). These examples are not meant to be limiting or exhaustive in type or amount.

In FIG. 2 an example table is depicted of the preferred embodiment of present invention. Specifically referring to FIG. 2, the first column identifies the "Context" 100 (e.g., biu.enter_biu=>leave_biu) and the second column identifies the "Category" 115 of data (e.g., dread, dwrite, iread). The third, fourth, and fifth columns identify the minimum, mean, and maximum response time, respectively. Next, column 6 (shown as count total column 117) identifies the "Count" (i.e., the number of samples) total information for each row (120, 125, and 130), including the composite count 140 for all rows. Following the Count total column 117 are the standard deviation and coefficient of variation columns, respectively. In this example, it is apparent that columns 1-8 are the same as those represented in FIG. 1. The remaining columns of FIG. 2 identify the buckets, in ascending or descending order (e.g., (-∞,2], (2,4], (4,6], . . . etc.).

In this example there exits one row for each category depicted, wherein the categories depicted are labeled as dread 120, dwrite 125, and iread 130 and one row for the composite count 140. The composite count 140 can exist as either the first or last row. The categories 115 presented herein are for example only and are not restricted to the specific types of categorical data shown by FIG. 2. The sample count 145 data for each bucket column 150 is presented as an integer in its corresponding cell. The calculated percentage of the data samples in each bucket column 150 is represented as a level of a gray-scale 110. This is but one of the advantages of the method disclosed, wherein the statistical information can be displayed in gray-scale 110. Such use of gray-scale 110 allows for greater clarity in displaying various statistical data.

Figure 6:
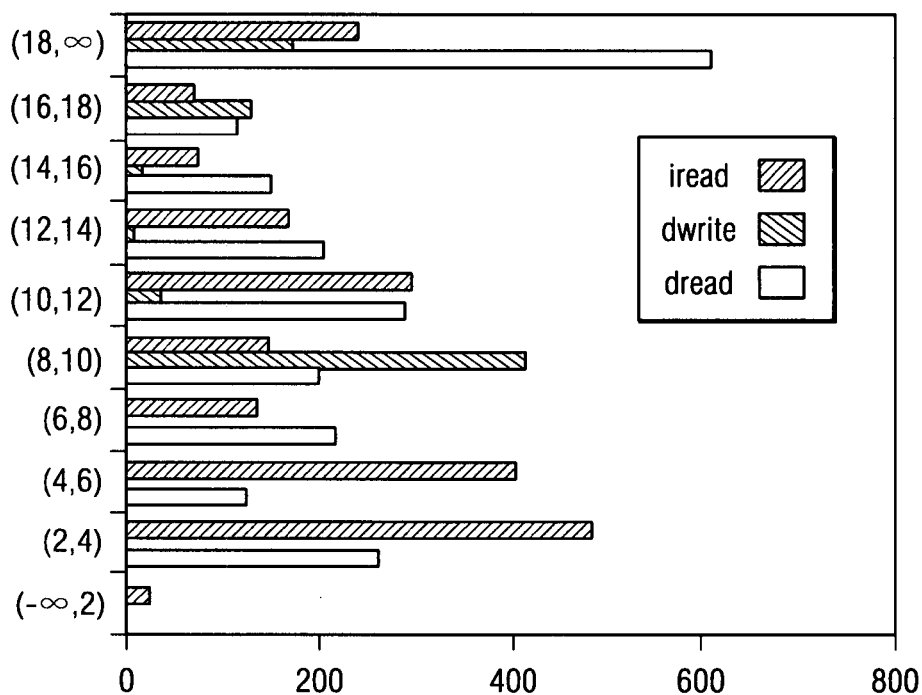
FIG. 6 is a graphical representation of data generated from FIG. 2.

The effect of combining histogram data with standard statistical measures provides a complete compact view of the data, which is easy to generate and can be viewed by HTML browsers, and viewed and manipulated in spreadsheets. Further, the data is structured using HTML tables to facilitate easy interpretation by Microsoft Excel® or other applications but is not limited by these examples shown herein. Such a compact view is very difficult to achieve when histogram data is presented using charts. In addition, the method of presenting all of the sample counts 145 in a single table allows data to be manipulated and graphed more easily. For example, FIG. 6 shows a graph easily generated from FIG. 2 using Microsoft Excel.

Figure 3:
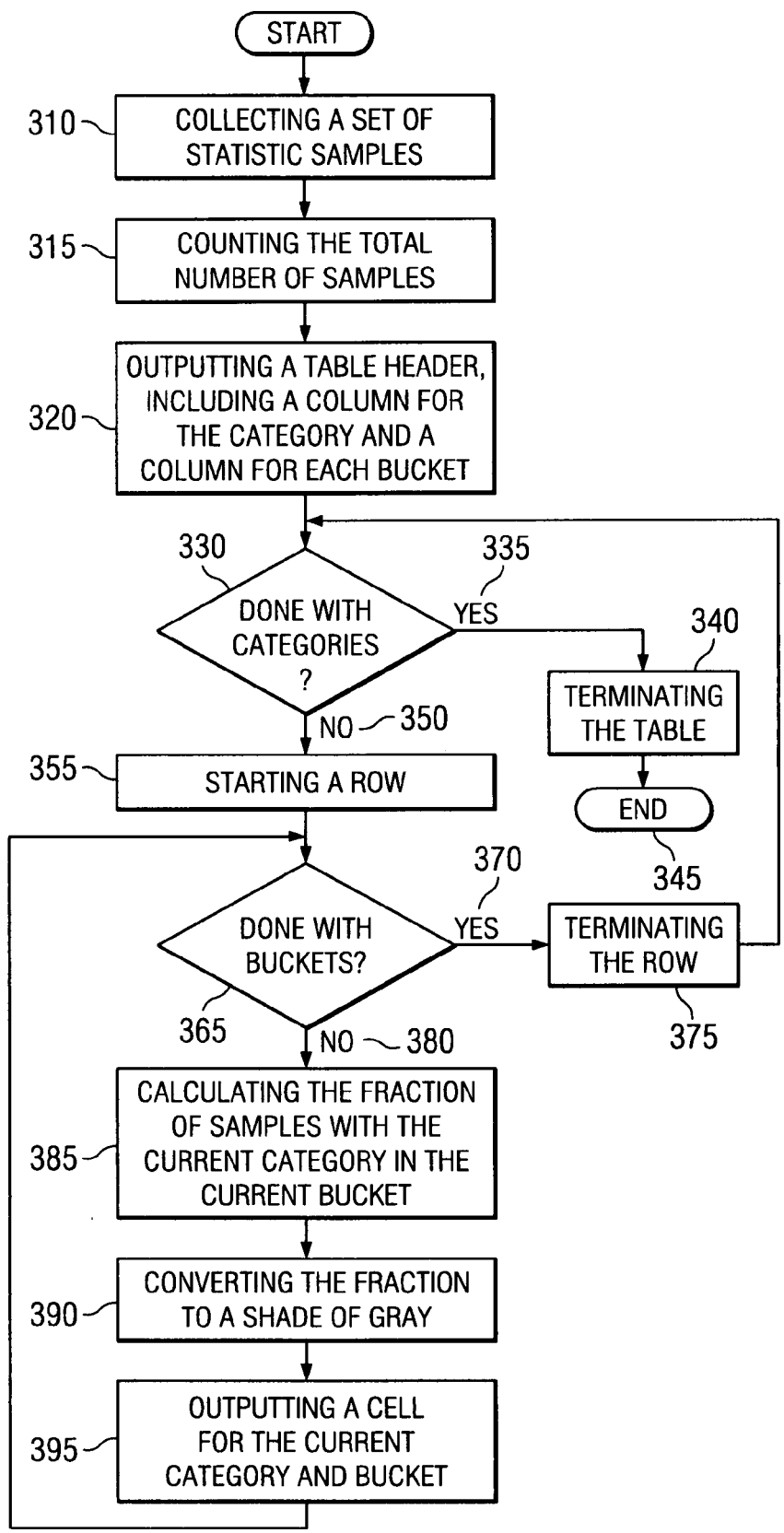
FIG. 3 is a flow block diagram depicting the method according to the present invention.
Figure 4A:
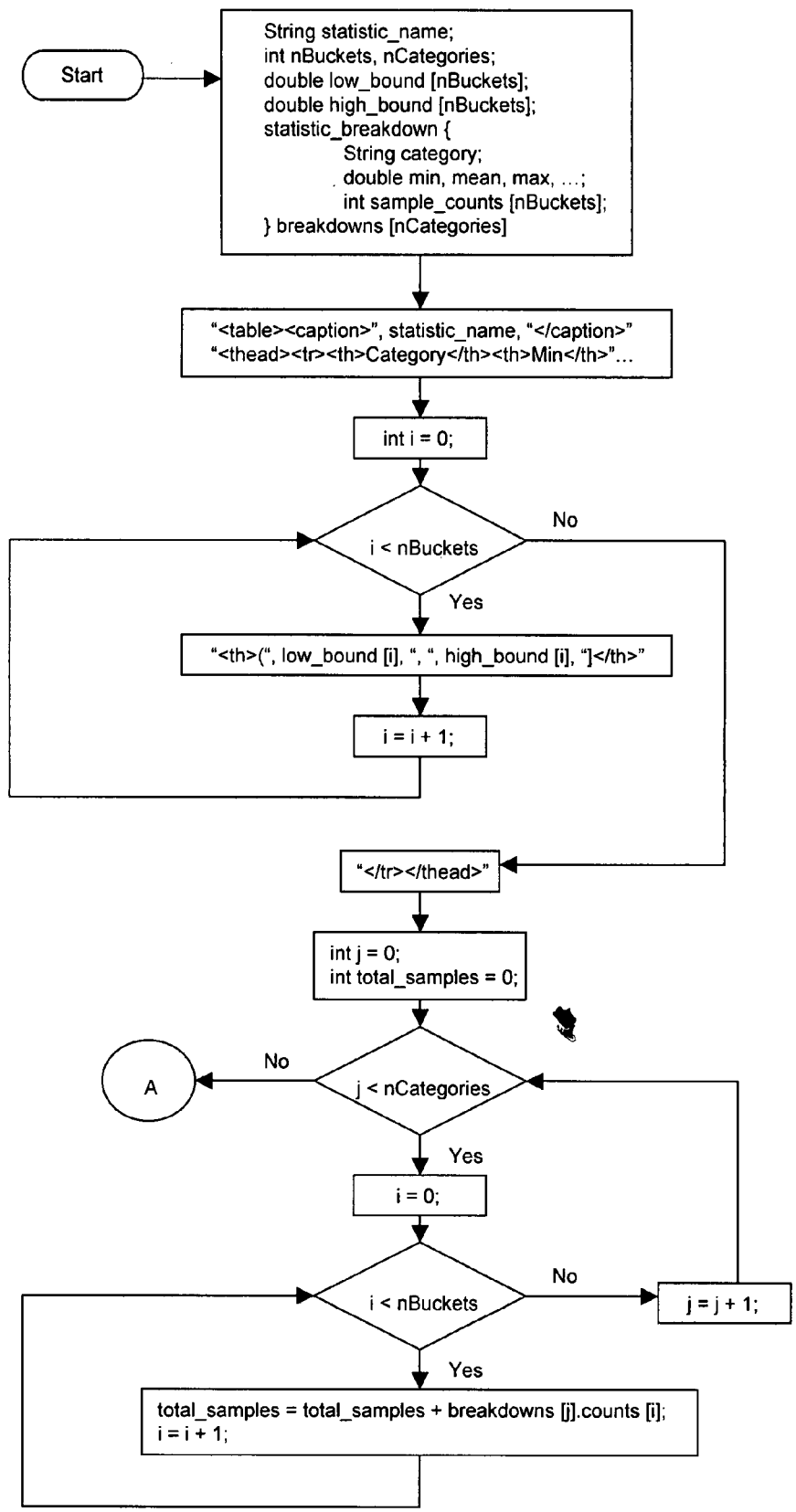
FIG. 4a illustrates an example of the algorithm used with the method according to the present invention.
Figure 4B:
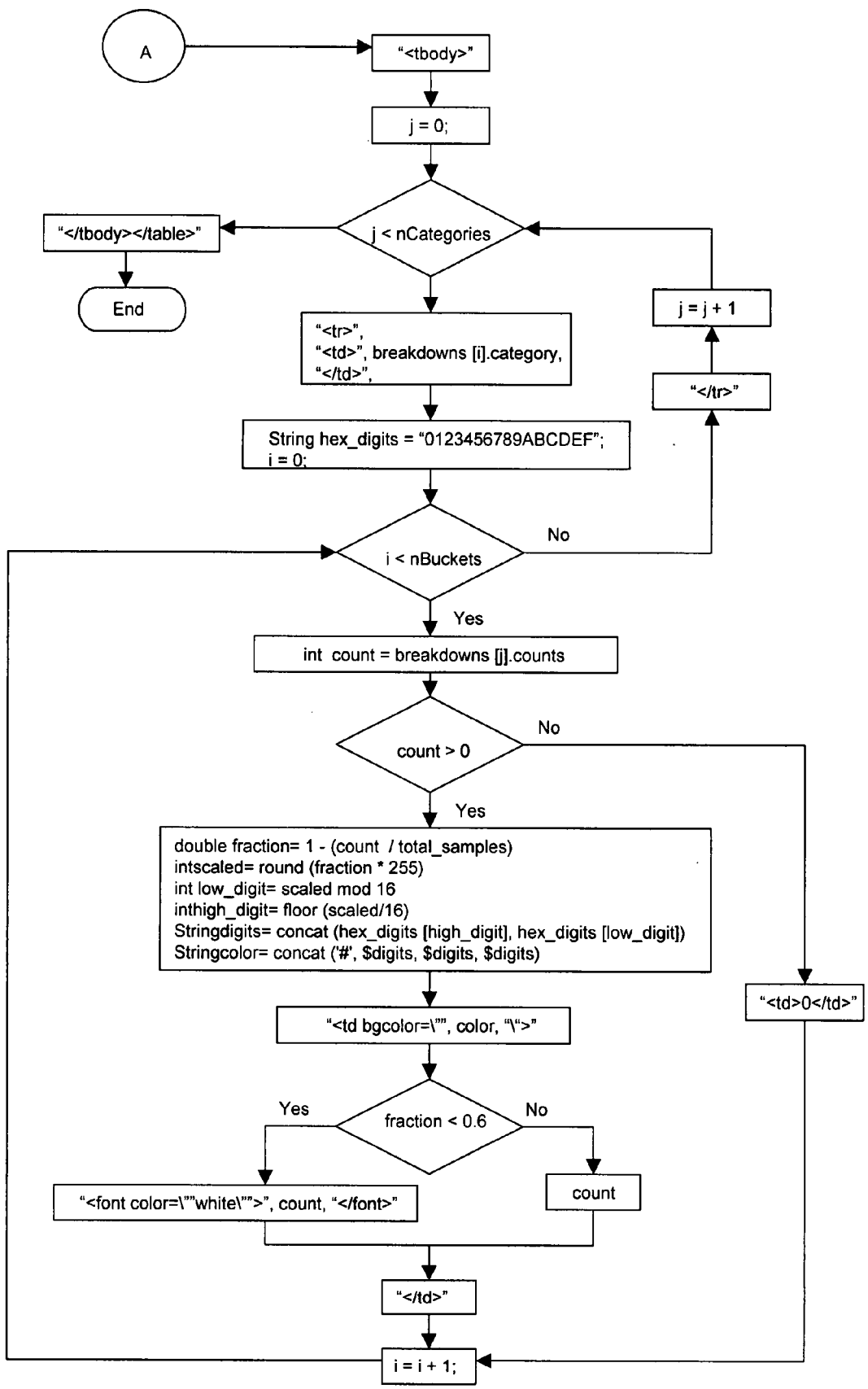
FIG. 4b illustrates an example of the algorithm used with the method according to the present invention.
Figure 5:
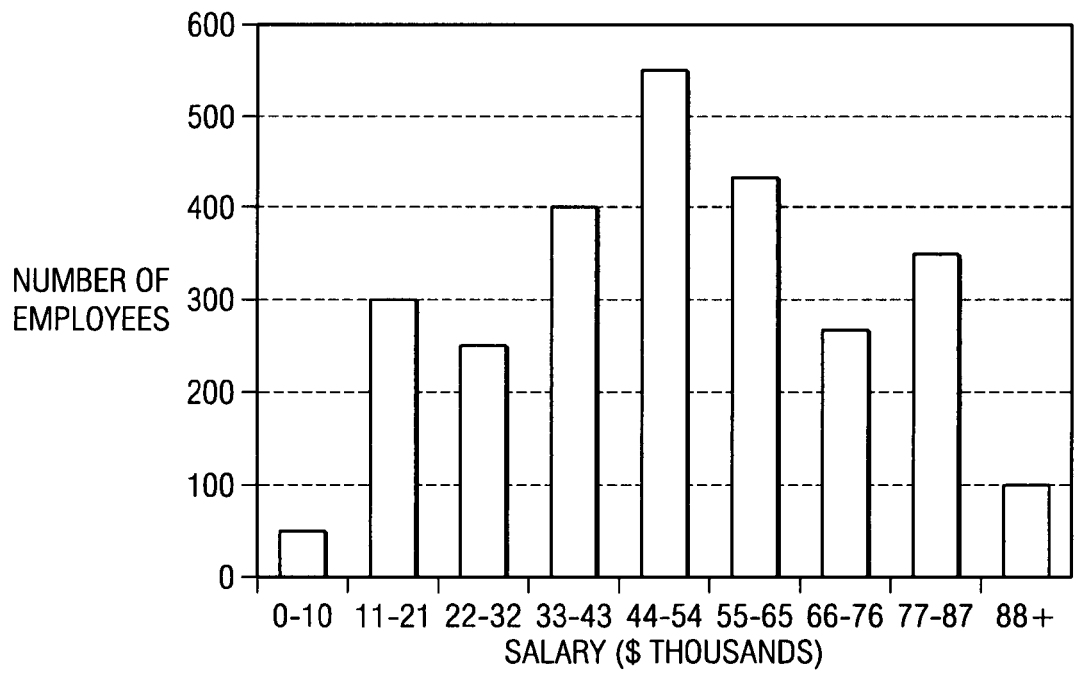
FIG. 5 is a graphical representation of the distribution of salaries in thousands of dollars of XYZ Company.

Referring now to FIG. 3, a flowchart is shown which depicts the method steps disclosed herein by the present invention. The method is performed by a computer having at least one display, wherein the computer comprises a central processing unit programmed with a computer program product and its code comprising the method herein, wherein the computer is communicably coupled to at least one display for displaying tabular data and superimposing gray-scale percentage information, or other statistical information, over individual statistic cell count data all within a single HTML based table. The specific algorithm used by the method of the present invention is disclosed and depicted in FIG. 4.

In more specific reference now to FIG. 3, the method of superimposing gray-scale percentage information over individual cell statistical data described above begins with the step of collecting a set of statistic samples 310. Step 310 further comprises grouping the collected set of statistic samples according to their category and assigning them to a set of buckets. Although collecting samples in step 310 is outside the scope of the invention disclosed herein it is provided for clarity, continuity, and completeness of the method. Next, step 315 then counts the total number of samples collected in step 310.

Further, step 320 outputs a table header comprising a column for the category and a column for each bucket which specifies therein its bounds (e.g., (−∞,2], (2,4], (4,6], etc.). Step 320 also comprises including columns for other standard statistical measures (e.g., Mean, Min, Max, Std. Dev., etc. as desired).

Next, in step 330, the method then determines if the process is done with the categories. If the process is done with the categories 335 then the end of the table is marked in step 340 and is ended 345. If, as in step 330, the process is not done with the categories 350, then as in step 355 a new row is started. In step 355 each new row started begins with cells for the category name and standard measures for the current category.

Next, step 365 determines if the process is done with the buckets. If the process is done with the buckets 370, the end of the row is marked in step 375 and repeats with step 330 as explained in the previous paragraph. If, as in step 380, the process is not done with the buckets the step of calculating the fraction of samples 385 with the current category in the current bucket is accomplished.

Next, step 390 requires converting the fraction calculated in step 385 to a shade of gray. This conversion is accomplished by subtracting the fraction derived in step 385 from one, multiplying the result by 256 (colors), converting the result to a pair of hexadecimal digits, and using the resulting hexadecimal digits for the red, green, and blue components of an HTML color.

Following the conversion to a shade of gray as explained above, step 395 outputs a cell for the current category and current bucket. This is done using the color computed in step 390 as the background color. The foreground (text color) is white if the fraction is less than 0.6 and black otherwise, in order to improve contrast with the cell background. Following step 395 the process repeats step 365 as explained above.

It should be emphasized that the above-described methods of the present invention, particularly, any "preferred" embodiments, are merely possible examples of implementations, merely set forth for a clear understanding of the principles of the invention. Many variations and modifications will be apparent to persons skilled in the art upon reference to the description and may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A computer for processing and displaying statistical information in a statistical table comprising:
   a central processing unit;
   a least one display communicably coupled to the central processing unit;
   a least one program operating on the central processing unit, wherein the program is operative to provide a signal for creating a statistical table and to calculate a set of percentage values from a set of cell data; and,
   wherein the display communicates with the central processing unit to simultaneously display the statistical information related to the set of percentage values, wherein the statistical information is approximately indicated by superimposing shades of gray selected by the program from a gray-scale color palette over the set of cell data within the statistical table, thereby allowing an analyst to easily interpret a plurality of statistical information comprised within the statistical table.

2. The computer of claim 1, wherein the statistical information is drawn from one or more of the group of, arrival of work at a computer node, a request for service at a computer node, arrival rates of work at a computer server and number of transactions waiting within a queue.

3. The computer of claim 2, wherein the gray scale color palette is in hexadecimal HTML compliant format.

4. The computer of claim 1, wherein the gray scale color palette comprises a plurality of shades of gray, wherein the palette includes darker shades of gray, wherein the darker shades of gray represent larger percentage values.

5. The computer of claim 1, wherein the gray scale color palette comprises a plurality of shades of gray, wherein the palette includes lighter shades of gray, wherein the lighter shades of gray represent smaller percentage values.

6. The computer of claim 1, wherein the set of cell data is represented in a two-tone color gray scale palette generally opposite the gray scale selected by the program and is calculated from the set of percentage values.

* * * * *